Patented July 13, 1948

2,445,226

UNITED STATES PATENT OFFICE 2,445,226

COATED GRANULES OF A DRY WATER-SOLUBLE SALT OF CARBOXYMETHYL CELLULOSE

Manfred Landers, New York, N. Y., assignor to Lanco Products Corporation, New York, N. Y., a corporation of New York No Drawing. Application March 23, 1946,
Serial No. 656,781

10 Claims. (Cl. 106—180)

The present invention relates to a carboxymethylcellulose composition of such a nature that it can be readily placed in solution in an aqueous medium and is more particularly concerned with compositions of this kind which are suitable for use in connection with the preparation of foodstuff products.

Carboxymethylcellulose is a material of cellulosic origin characterized by a chemical constitution identical with that of methyl cellulose except that one of the hydrogens of the methyl group of methyl cellulose has been replaced by a carboxyl group. The material may be prepared by methods which involve reaction of an alkaline salt of a monohalogenated acetic acid with an alkali cellulose, or in other ways which do not involve a direct hydrogen replacement. Commercial carboxymethylcellulose as it is presently available represents a mixture of methyl cellulose and its carboxy substituted products.

The references herein to carboxymethylcellulose and its salts are to be understood as including such products in their various commercial forms as well as the pure compounds. Carboxymethylcellulose is also known as cellulose glycollic acid and its salts as the corresponding cellulose glycollates.

The carboxymethylcelluloses in the form of their water soluble salts, of which sodium carboxymethylcellulose is a typical example, have been found to give highly beneficial results when incorporated in ice cream. The presence of these materials in the ice cream mix before it is frozen results in a completed ice cream of improved texture with respect to its graininess, and at the same time the amount of overrun produced during the freezing operation is highly satisfactory. However, their more general adoption for use in ice cream mixes has suffered from the drawback that they go into solution very slowly.

The water-soluble carboxymethylcellulose compositions are most conveniently available in the form of a dry granular powder. The nature of the material is such, however, that when it is added to an aqueous medium in dry granular condition the outer surfaces of the granules take up water with the formation of gelatinous and sticky outer layers which are highly impenetrable to water. The granular water-soluble carboxymethylcellulose under these conditions tends to clump and form aggregates in which the material at the center remains dry and unaffected by the water for a considerable period of time. The result is that the carboxymethylcellulose composition goes into solution very slowly and a considerable time is required, even under vigorous agitation, to bring the small quantities of the material ordinarily employed into complete solution.

The present invention is directed to the problem of overcoming this difficulty in effecting solution of the water-soluble carboxymethylcellulose compositions and provides a carboxymethylcellulose composition which is readily water-soluble and methods by which this composition may be made.

It is accordingly an object of the present invention to provide a dry granular carboxymethylcellulose composition which readily goes into solution when introduced into an aqueous medium.

A further object of the invention is to provide processes by which carboxymethylcellulose compositions may be provided in a form in which they will rapidly dissolve when placed in water or other aqueous mediums.

In accordance with the invention I have found that dry granular water-soluble carboxymethylcellulose salts may be pre-treated with certain other materials in such a way as to in effect individualize the granules so that they do not stick together and so that they preserve their individual identity until such time as the material is to be employed by being formed into an aqueous solution or suspension, and that when so pre-treated with suitable materials the granules lose their tendency to clump and form aggregates when introduced into an aqueous medium. Each granule is brought individually into complete and intimate contact with the surrounding medium and rapidly goes into solution therein.

Briefly stated, the invention consists in associating a water-soluble carboxymethylcellulose composition in dry granular condition with a mono or di-glyceride of a higher fatty acid or a mixed diglyceride of a higher fatty acid and an aromatic carboxylic acid. The association of the granules and the glyceride is effected in such a way that the individual granules are provided with a thin coating of the glyceride.

I have found that the carboxymethylcellulose salts may be treated to secure the desired results by melting the glyceride coating material, thoroughly mixing the powdered carboxymethylcellulose salt and the melted mass and subsequently cooling the mixture to congeal the glyceride. Another method of operation consists in forming a solution of the glyceride in a suitable volatile solvent, thoroughly stirring the solution with the granular carboxymethylcellulose composition and subsequently driving off the volatile solvent.

As illustrative of glycerides which are suitable for use in the pretreatment of the water-soluble carboxymethylcellulose compositions to form readily water-soluble granular masses, the monoglycerides of stearic, oleic, palmitic, lauric, butyric and linoleic acids, the diglycerides of stearic, oleic or palmitic acids and the mixed diglycerides of a higher fatty acid and an aromatic carboxylic acid are typical satisfactory materials. Glyceryl α-stearate-γ-benzoate and glyceryl α-stearate γ-naphthenate are representative of the mixed diglycerides. These materials are completely innocuous and unobjectionable when present as an ingredient in foodstuffs.

The following are representative specific examples of procedures that may be employed in practicing the invention:

Example 1

Five pounds of glycerol monostearate are melted and placed in a suitable mixer, which is either hot water or steam jacketed and which will keep the contents at a temperature slightly higher than the melting point of the coating material. One thousand pounds of a commercial grade of a water-soluble carboxymethylcellulose salt are then added gradually and the whole is mixed for about twenty minutes or until a uniform distribution of the glycerol monostearate has taken place. The whole mass is then allowed to cool off to room temperature in order to solidify the glycerol monostearate which will be found to have surrounded the granules of the carboxymethylcellulose in the form of a thin coating. The carboxymethylcellulose product used in my tests was that sold commercially by Dow Chemical Company under the trade name CMC.

Example 2

Five pounds of glycerol monostearate are dissolved in 15 pounds of sulphuric ether. The resulting solution is then placed in a suitable mixer and 1,000 pounds of a water-soluble carboxymethylcellulose salt are gradually added with stirring. After a uniform mixture has been effected, the temperature of the mix is raised sufficiently to evaporate the ether. After all of the ether has been evaporated, the mix is then cooled to room temperature. It will be found that the glyceride has formed a uniform thin coating around the granules of the carboxymethylcellulose composition.

Similar results may be obtained by substituting for the glycerol monostearate a suitable proportion of a monoglyceride of another higher fatty acid, a diglyceride of one of the higher fatty acids or a mixed diglyceride of a higher fatty acid and an aromatic carboxylic acid. The proportion of the glyceride required to insure a satisfactory result will vary somewhat for the different glycerides but can readily be determined by test. In general, 0.25% to 1.50% of the glyceride, by weight, on the basis of the weight of the carboxymethylcellulose to be treated will accomplish the desired purpose. Larger proportions of the glyceride may be employed with satisfactory results in so far as rapid solution of the composition in water is concerned; even an amount of glyceride as great as 30% of the weight of the carboxymethylcellulose composition may be employed with good results. I prefer, however, to employ about 0.5% to 1.0% of the glyceride.

When the carboxymethylcellulose compositions of the present invention are to be placed in solution in water or some other aqueous medium they may be added directly in dry granular condition to the liquid without further treatment. If the coating material employed is one which is soluble or dispersible in cold water it will be found that the pretreated carboxymethylcellulose composition rapidly goes into solution in the liquid. The rate of solution may be improved by stirring. If the glyceride employed is one which is not soluble or dispersible in cold water but dissolves or disperses in warm water, the solution of the carboxymethylcellulose composition may be facilitated by gradually raising the temperature of the aqueous medium with stirring after the carboxymethylcellulose composition has been added to it. In all cases the melting points and solubility characteristics of the class of glycerides defined herein are such that the pretreated carboxymethylcellulose composition will readily go into solution in an ice cream mix at the temperatures customarily employed in preparing such mixes.

The improvement in the rate of solution of carboxymethylcellulose salts treated according to my invention as compared with the rate of solution of such salts that have not been subjected to such a preliminary treatment is striking. For example, when CMC is mixed with water in the proportion of 1 g. of CMC to 100 cc. of water, it takes between 24 and 48 hours for the CMC to dissolve, the variation in time depending upon the temperature and the mixing conditions maintained. On the other hand, if CMC that has been treated according to either one of the above described methods is mixed with water in similar proportions, i. e., 1 g. of CMC to 100 cc. of water, it will dissolve completely in from 15 to 20 minutes.

While the invention has been described with particular reference to use of the treated carboxymethylcellulose product in forming ice cream mixes, it is to be understood that the product has many other useful applications. The invention is not to be deemed as limited otherwise than as indicated by the appended claims:

I claim:

1. A readily water-soluble dry granular composition primarily consisting of relatively small granules of a water-soluble salt of carboxymethylcellulose individually coated with thin films of a glyceride selected from the class consisting of the mono- and the diglycerides of the higher fatty acids and the mixed diglycerides of a higher fatty acid and an aromatic carboxylic acid.

2. A readily water-soluble dry granular compostion primarily consisting of relatively small granules of a water-soluble salt of carboxymethylcellulose individually coated with thin films of a mono-glyceride of a higher fatty acid.

3. A readily water-soluble dry granular composition primarily consisting of relatively small granules of a water-soluble salt of carboxymethylcellulose individually coated with thin films of a diglyceride or a higher fatty acid.

4. A readily water-soluble dry granular composition primarily consisting of relatively small granules of a water-soluble salt of carboxymethylcellulose individually coated with thin films of a mixed diglyceride of a higher fatty acid and an aromatic carboxylic acid.

5. A readily water-soluble dry granular composition primarily consisting of relatively small granules of a water-soluble salt of carboxymethylcellulose individually coated with thin films of glycerol monostearate.

6. A readily water-soluble dry granular composition primarily consisting of relatively small granules of a water-soluble salt of carboxymethylcellulose individually coated with thin films of a glyceride selected from the class consisting of the mono- and the diglycerides of the higher fatty acids and the mixed diglycerides of a higher fatty acid and an aromatic carboxylic acid, said glyceride being present in an amount of the order of 0.25% to 1.5% of the weight of the carboxymethylcellulose.

7. A readily water-soluble dry granular composition essentially consisting of relatively small granules of a water-soluble salt of carboxymethylcellulose individually coated with thin films of glycerol monostearate, the glycerol monostearate being present in an amount between 0.25% and 1.0% of the weight of the carboxymethylcellulose.

8. A readily water-soluble dry granular composition consisting of relatively small granules of sodium carboxymethylcellulose individually coated with thin films of a glyceride selected from the group consisting of the mono- and diglycerides of the higher fatty acids and the mixed diglycerides of a higher fatty acid and an aromatic carboxylic acid.

9. A readily water-soluble dry granular composition consisting of relatively small granules of sodium carboxymethylcellulose individually coated with thin films of glycerol monostearate.

10. A readily water-soluble dry granular composition consisting of relatively small granules of sodium carboxymethylcellulose individually coated with thin films of glycerol monostearate, the glycerol monostearate being present in an amount between 0.25% and 1.0% of the weight of the sodium carboxymethylcellulose.

MANFRED LANDERS.

REFERENCES CITED

The following references are of record in the file of this patent:

UNITED STATES PATENTS

| Number | Name | Date |
| --- | --- | --- |
| 1,692,996 | Richardson | Nov. 17, 1928 |
| 2,065,398 | Roth | Dec. 22, 1936 |
| 2,199,386 | Bass et al. | May 7, 1940 |
| 2,245,040 | Marks | June 10, 1941 |
| 2,395,061 | Musher | Feb. 19, 1946 |